(12) United States Patent
Gurney et al.

(10) Patent No.: US 8,744,021 B1
(45) Date of Patent: Jun. 3, 2014

(54) SYSTEMS, METHODS, AND DEVICES FOR IMPROVING SIGNAL QUALITY

(71) Applicant: Motorola Solutions, Inc., Schaumburg, IL (US)

(72) Inventors: David P. Gurney, Carpentersville, IL (US); Stephen L. Kuffner, Algonquin, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 4 days.

(21) Appl. No.: 13/690,793

(22) Filed: Nov. 30, 2012

(51) Int. Cl.
*H04L 27/06* (2006.01)
*H04L 27/00* (2006.01)

(52) U.S. Cl.
USPC .......................................... 375/344; 375/316

(58) Field of Classification Search
USPC ......... 375/344, 232, 233, 316, 317, 320, 345, 375/355; 348/725, 726, 614; 455/142, 455/232.1
See application file for complete search history.

(56) References Cited

U.S. PATENT DOCUMENTS

| | | | |
|---|---|---|---|
| 5,861,831 A | 1/1999 | Murden | |
| 6,337,885 B1 | 1/2002 | Hellberg | |
| 6,545,728 B1 * | 4/2003 | Patel et al. | 348/725 |
| 7,317,774 B2 | 1/2008 | Richey et al. | |
| 7,634,028 B2 | 12/2009 | Crawley | |
| 7,724,806 B2 | 5/2010 | Franck et al. | |
| 8,185,078 B2 | 5/2012 | Martens et al. | |
| 8,331,515 B2 * | 12/2012 | Shibata | 375/355 |
| 2002/0193090 A1 | 12/2002 | Sugar et al. | |
| 2008/0180579 A1 | 7/2008 | Maxim | |
| 2008/0181337 A1 | 7/2008 | Maxim | |
| 2010/0328544 A1 | 12/2010 | Hendrickson | |
| 2013/0243135 A1 * | 9/2013 | Row et al. | 375/350 |

* cited by examiner

*Primary Examiner* — Khai Tran
(74) *Attorney, Agent, or Firm* — Kenneth A. Haas; Steven A. May

(57) ABSTRACT

Improving signal quality by sampling an intermediate frequency signal by an analog-to-digital converter (ADC) and determining spectral characteristic data of the output signal of the ADC, and processing the spectral characteristic data to identify blocking signals and blocking spur signals that interfere with any desired signals. An adjustment is made to the frequency of one or more oscillators to reduce the interference resulting from the blocking signals if a ratio of the desired signal level to the total interfering blocker spur level is below a threshold.

20 Claims, 11 Drawing Sheets

| INPUT BLOCKER POWER ($P_{BL}$) (dBm or dBFS) | HARMONIC ORDER (k) | RELATIVE BLOCKER HARMONIC LEVEL ($A_k$) (dBr or dBFS) |
|---|---|---|
| -25dBm (-5 dBFS) | 2 | -98 dBr (-103 dBFS) |
| -30dBm (-10 dBFS) | 2 | -95 dBr (-105 dBFS) |
| -35dBm (-15 dBFS) | 2 | -93 dBr (-108 dBFS) |
| -25dBm (-5 dBFS) | 3 | -113 dBr (-118 dBFS) |
| -30dBm (-10 dBFS) | 3 | -100 dBr (-110 dBFS) |
| -35dBm (-15 dBFS) | 3 | -89 dBr (-104 dBFS) |
| -25dBm (-5 dBFS) | 4 | -120 dBr (-125 dBFS) |
| -30dBm (-10 dBFS) | 4 | -94 dBr (-114 dBFS) |
| -35dBm (-15 dBFS) | 4 | -95 dBr (-110 dBFS) |
| ... | ... | ... |

*FIG. 11*

SYSTEMS, METHODS, AND DEVICES FOR IMPROVING SIGNAL QUALITY

FIELD OF THE INVENTION

The field of the invention generally relates to improving signal quality in electronic devices. Particularly, the field of the invention relates to improving the signal quality from analog-to-digital converters used in receivers.

BACKGROUND

State of the art receivers used in base stations of communications networks include components, such as an antenna to receive a signal, a local oscillator to translate the signal to an intermediate frequency (IF), and filters to reduce noise in the signal. Further, such receivers may also include an analog-to-digital converter (ADC) to sample the intermediate frequency signal, and one or more numerically controlled oscillators to down-convert or provide a baseband signal. Generally, the ADC introduces distortion caused by the ADC sampling the intermediate frequency signal.

BRIEF DESCRIPTION OF THE SEVERAL VIEWS OF THE DRAWINGS

The accompanying drawings, which are incorporated in and constitute part of this specification, illustrate certain embodiments of the invention and together with the description serve to explain the principles of the present disclosure. The embodiments illustrated herein are presented as examples, it being understood, however, that the invention is not limited to the precise arrangements and instrumentalities shown, wherein:

FIG. 11 is an example relative aliased blocking signal level table according to embodiments of the disclosure;

DETAILED DESCRIPTION

The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of difference configurations, all of which are explicitly contemplated herein. Further, in the foregoing description, numerous details are set forth to further describe and explain one or more embodiments. These details include system configurations, block module diagrams, flowcharts (including transaction diagrams), and accompanying written description. While these details are helpful to explain one or more embodiments of the disclosure, those skilled in the art will understand that these specific details are not required in order to practice the embodiments.

Figure 1:
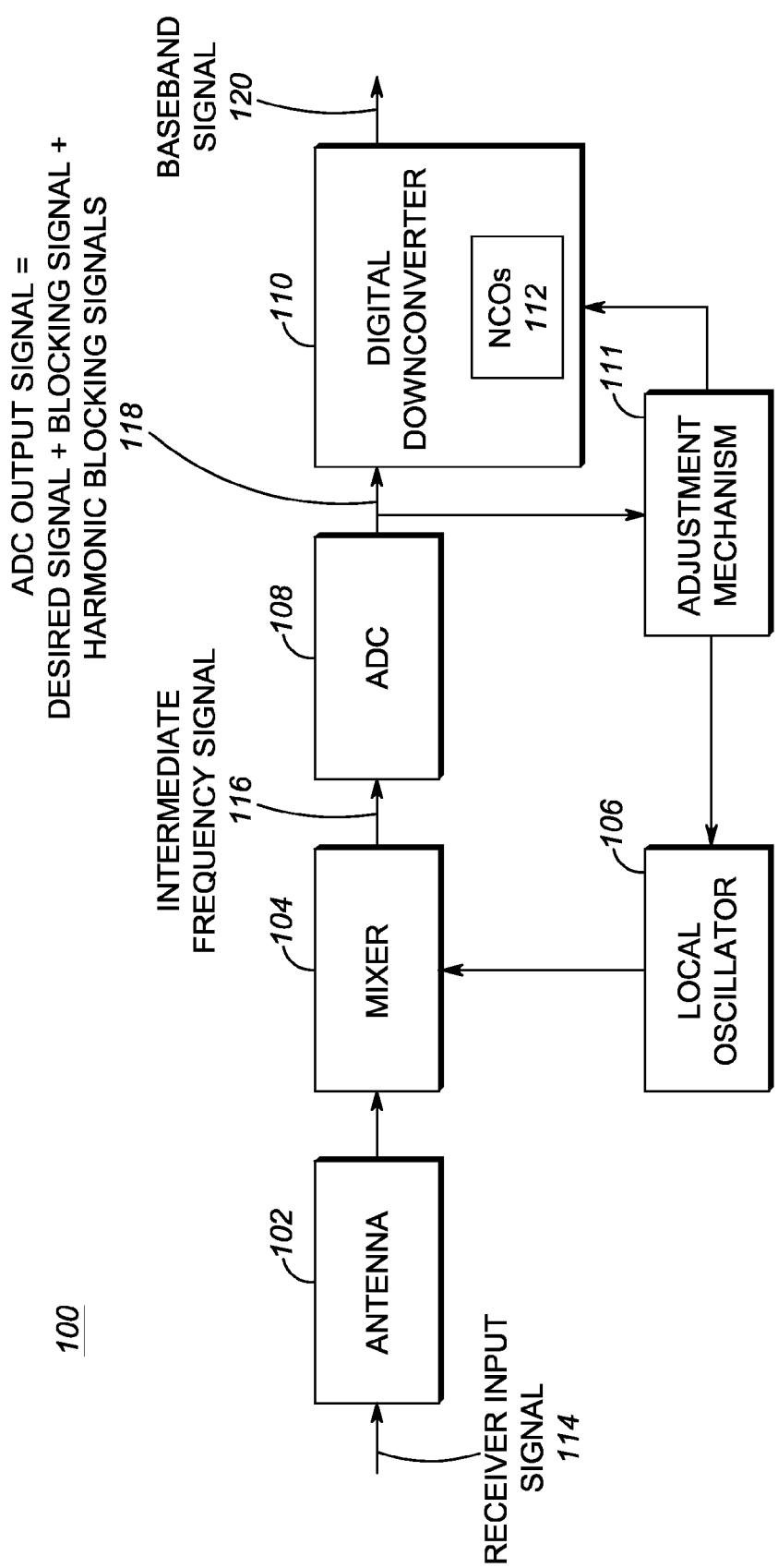
FIG. 1 is a functional block diagram of a receiver according to embodiments of the disclosure.

FIG. 1 is a functional block diagram 100 of an example receiver. The receiver includes an antenna 102 coupled to a main signal path comprising a mixer 104 that is coupled to an analog-to-digital converter (ADC) 108, and one or more digital downconverters 110 that are coupled to the ADC, where the digital downconverters each use a numerical controlled oscillator 112 to translate the individual desired signals to baseband. The receiver further includes a frequency control circuit comprising an adjustment mechanism 111 that is operably coupled to an output of ADC 108, to the one or more digital downconverters 110, and to a local oscillator (LO) 106 that is coupled to the adjustment mechanism and to the mixer 104. In some embodiments, the adjustment mechanism may be incorporated into the digital downconverter block. The antenna 102 receives a receiver input signal 114 and provides such a signal as an input to the mixer 104. The receiver input signal 114 may be a signal carrying one or more voice and/or data channels for a wireless network, such as a land mobile radio system, trunked radio systems, cellular networks, etc. In many cases, these networks and data channels may carry mission critical communications. In addition, the local oscillator 106 provides a mixing signal to the mixer 104 such that the mixer 104 modulates the receiver input signal 114 with the mixing signal to translate it to an intermediate frequency (IF) signal 116. The ADC 108 samples the intermediate frequency signal 116 and provides an ADC output signal 118 to the one or more digital downconverters 110. The one or more NCOs 112 frequency translate desired communications channels in the sampled IF signal 118 to baseband (e.g., in-phase and quadrature) signals 120. Note however that in some implementations, the IF frequency may be centered at zero hertz, with the mixing stages preceding the ADC.

Due to high level input signals (e.g., termed "blockers") and non-linearities in the sampling process, ADC 108 may introduce one or more harmonic blocking signals (or spurs) which alias onto the desired channel. The blocking spur signals that fall within a desired channel are typically generated by distortion within the ADC 108 itself (and cannot be externally filtered off). Such blocking signals and corresponding harmonics, or spurs, may be in the same frequency range of the desired signal (e.g., in the voice or data channel) from the ADC and thus cause interference, while others may fall harmlessly outside the desired signal frequency range and consequently not interfere with reception of the desired signal. An adjustment mechanism 111 typically accepts the ADC output signal 118 and processes the sampled signal to determine whether a desired signal to interference, noise and distortion (SINAD) ratio is below a certain threshold. The determination may be made analytically based on the magnitude and frequency of the blocking signal(s) together with known spur-generation characteristics of the ADC, rather then empirically (via measurement). If the SINAD is below a threshold, the adjustment mechanism 111 may then adjust the frequency of the local oscillator 106 and/or the frequency of the one or more digital NCOs 112 such that the blocking signal and corresponding harmonics are adjusted to a frequency that does not interfere with the desired signal. Further embodiments may also determine or predict whether the adjusted frequency of the local oscillators 106 and/or NCOs 112 resulted in, or might result in causing the blocking signal and (possibly different) corresponding harmonics to interfere with the same or another desired signal. If so, then the adjustment mechanism 111 may select a different frequency to adjust the local oscillator 106 and NCOs 112.

As used herein, the term IF signal refers to a signal generated by translating a higher-frequency signal to some lower frequency signal for further processing, hence the use of "intermediate". The IF signal will typically have a limited bandwidth, and may contain a number of separate physical layer signals, or channels, residing at various different frequencies. The term "IF signal" may also refer to signals, including desired signals, that reside at or significantly near baseband frequencies.

Figure 2:
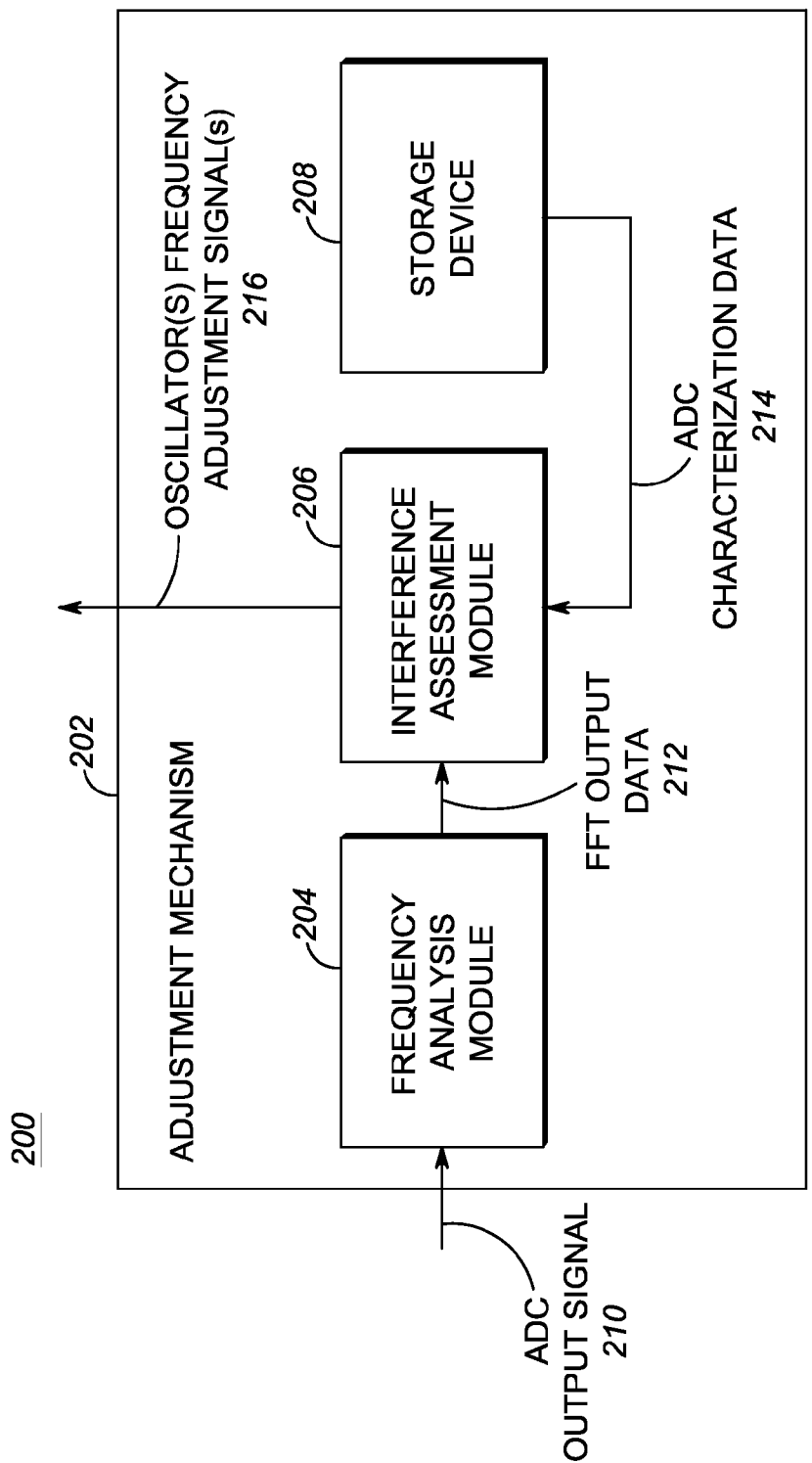
FIG. 2 is a functional block diagram of an adjusting mechanism according to embodiments of the disclosure.

FIG. 2 is a functional block diagram 200 of an example adjustment mechanism 202, such as adjustment mechanism 111. The adjustment mechanism 202 includes a frequency analysis module 204, an interference assessment module 206, and a storage device 208 that are coupled together through a bus, external network (Ethernet, LAN, etc.), combination thereof, or by another method known in the art. The frequency analysis module 204 receives and performs a spectral characterization, or estimation, via, e.g., a Fast Fourier Transform (FFT) on a sampled ADC output signal 210, or other signal representing an ADC output signal (e.g., a decimated and/or filtered version of the output signal) to produce spectral characterization, or estimation data 212 corresponding to the ADC output signal. Persons of ordinary skill in the art would understand that an FFT is one way of obtaining spectral characteristic data of the ADC output signal, and there are other ways of obtaining the spectral characteristic data of the ADC output signal including the use of digital filter banks, alternative transforms (e.g., Discrete Cosine Transforms, Fast Hadamard Transforms, etc.), and scanning receivers. Further, the structural aspects of various embodiments of the frequency analysis module may include a digital signal processing field programmable gate array (FPGA), an application specific integrated circuit (ASIC) or a digital signal processor (DSP) programmed to execute an FFT or other transform or filtering operation.

The spectral characterization, e.g., FFT output, data 212 is transferred to and processed by the interference assessment module 206 to classify a desired signal at a desired frequency as well as to identify any potential blocking signals and their corresponding harmonic blocking signals and frequencies. The harmonic blocking signals may also be called blocking spurious signals (or "spurs"), or blocking spur frequencies.

During the processing of the IF frequency/spectrum characteristic data such as FFT data 212, the interference assessment module 206 may access ADC characterization data 214 from the storage device 208 to assist in identifying blocking spur signals and respective frequencies from the one or more blocking signals. Each blocking spur signal has a blocking spur level that may be the energy, magnitude, amplitude, strength, etc. of the corresponding blocking spur signal. The ADC characterization data may be normalized relative to a specified input signal level (as further described below), and the actual signal level of the blocking signal may then be used to scale the magnitude of the blocking spurs. Further, each desired signal may have a corresponding desired signal level that may be the energy, magnitude, amplitude, strength, etc. of the desired signal that may be determined through the FFT, or several other demodulation or estimation means.

Upon identifying the desired signal at a desired frequency and a blocking signal at a blocking frequency, the interference assessment module 206 may determine whether any of the aliased blocking spur signals are located at a frequency that is substantially similar to the desired frequency. In some embodiments, the blocking spur frequency is within a predetermined offset of the desired frequency. In other embodiments, the predetermined range may be influenced by the bandwidth of the blocking signal (which because of the spectral spreading of the harmonics may impact the bandwidth of the blocking spurs). In other embodiments, the predetermined range may be influenced by the bandwidth of the desired signal, or possibly the signal level of the desired signal. In some embodiments, the interference assessment module 206 calculates a ratio of a desired signal level to a total interfering spur level. The total interfering spur level is the sum of blocking signal levels falling within a desired channel and may be found using the ADC characterization data as described above. Further, the ratio of the desired signal level to the total interfering spur level plus noise is generally referred to as a SINAD ratio. In some embodiments, the noise term may be ignored for expediency. The interference assessment module 206 determines whether the SINAD ratio is below a threshold (such as 15 dB). Thereafter, the interference assessment module 206 may provide signals 216 to adjust the frequency of the one or more local and numerically controlled oscillators in response to the ratio being below a threshold. Embodiments of the interference assessment module 206 may include a digital signal processor, ASICs, FPGAs, or other computer processing devices known to persons of ordinary skill in the art. In some embodiments, a dual threshold may be used, such that if the ratio is below a first threshold then a frequency adjustment must be made immediately due to more severe signal interference. In these embodiments, if the ratio is above the first threshold indicating that severe distortion is not present, but yet below a second, less-stringent threshold, then an adjustment may still be desired to decrease the level of interference, but the adjustment may be delayed until the channel is not in active use for data or voice transmissions.

Other embodiments of the adjustment mechanism 202 may include the interference assessment module 206 determining a candidate frequency change and corresponding one or more potential blocking spur frequencies and signal levels based on processing the ADC characterization data 214. Such processing may determine a total potential interfering spur level that is the sum of levels of potential blocking spurs that fall within the desired channel. The interference assessment module 206 may then calculate a potential SINAD ratio (for the candidate frequency change) of the desired signal level to a total potential interfering spur level as well as determine whether the potential SINAD ratio is below a third threshold, for example, which may be the same as the first threshold above (15 dB). If so, then the interference assessment module 206 determines a different frequency for the LO and NCO. However, if the potential SINAD ratio (for the candidate frequency change) is above the third threshold then the interference assessment module 206 accepts and provides signals 216 to adjust the frequency of the one or more oscillators. The signals 216 may include a voltage for a voltage controlled analog oscillator, or may be some control data bits loaded to a register in the case of a digitally controlled analog oscillator (e.g., a PLL synthesizer), and may also include other digital signals or controls in the case of Numerically Controlled Oscillators.

In further embodiments of the adjustment mechanism 202, the interference assessment module 206 determines whether the SINAD ratio is below a fourth threshold (such as 25 dB), for example, which may be the same at the second threshold above. If the SINAD ratio is below the fourth threshold then the interference assessment module 206 provide signals 216 to adjust the frequency of the one or more local and numerically controlled oscillators at a later time. That is, the interference assessment module 206 provides a delayed adjustment of the frequency of the one or more oscillators based on the activity of the desired signals in question. For example, the frequency adjustment may be performed after current packet bursts are received or when the receiver is idle.

Figure 3:
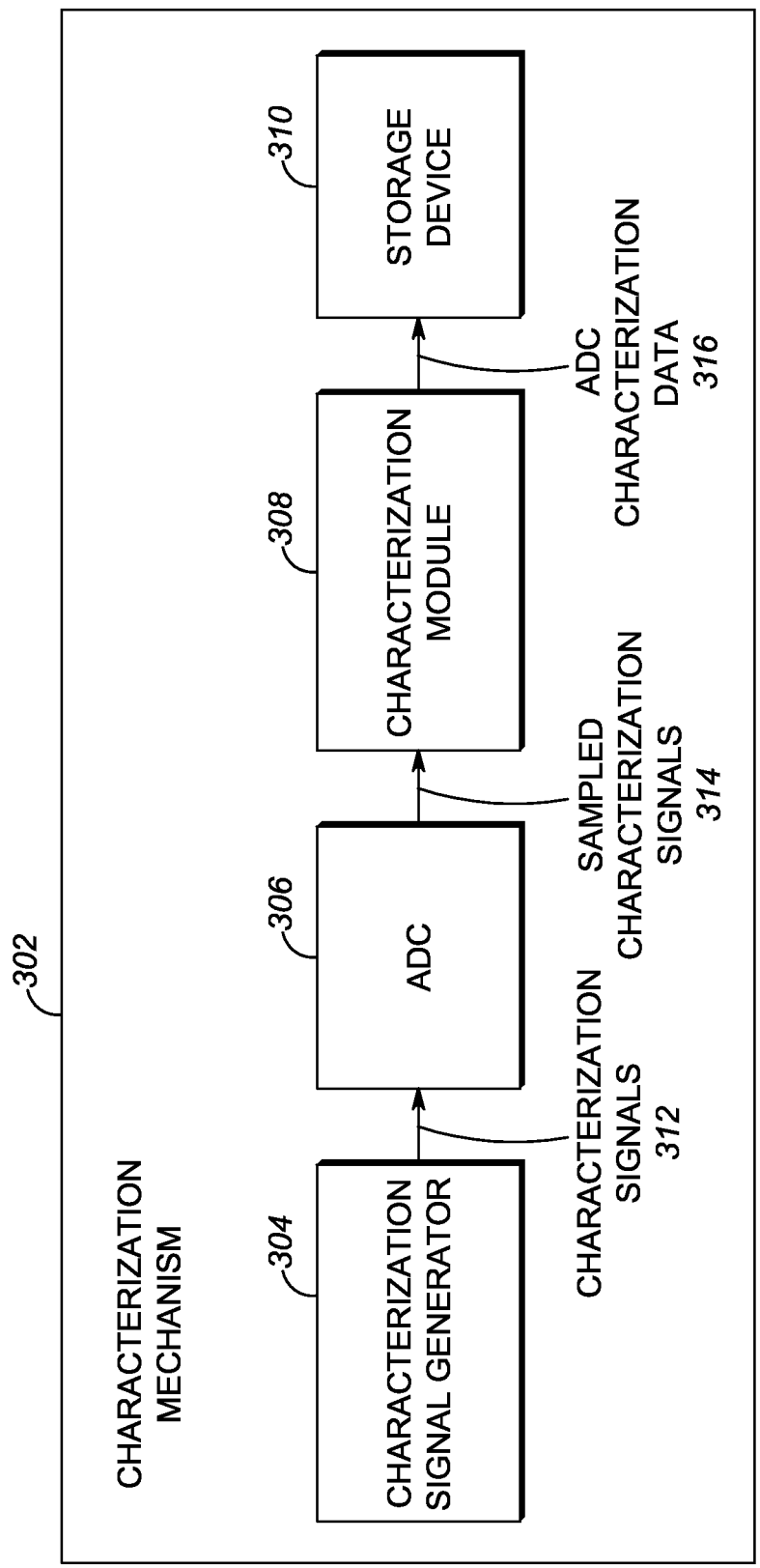
FIG. 3 is functional block diagram of a characterization mechanism according to embodiments of the disclosure.

FIG. 3 is functional block diagram 300 of an example ADC characterization mechanism 302. The characterization mechanism 302 includes a characterization signal generator 304, ADC 306, characterization module 308, and a storage device 310. The characterization mechanism 302 may be used to obtain the spectral characteristics of spurs generated at the ADC sampled output with respect to input signals at predetermined frequencies. The characterization module 308 determines the spectral characteristics of the spurs to identify spur signals at corresponding spur frequencies given a characterization signal 312 at a characterization frequency as an input to the ADC from generator 304. The characterization signal generator 304 may provide several different characterization signals 312 at different frequencies (e.g., two-tone tests) to provide more robust ADC characterization data 316. The spectral characteristics of the spurs may be determined via a FFT of the sampled characterization signals 314. The ADC characterization data 316 including the blocking signals and spur blocking signals may be stored in one or more lookup tables on the storage device 310.

In other embodiments, the ADC characterization data 316 may come from the ADC manufacturer or data sheet. Embodiments of the characterization mechanism 302 may include obtaining ADC characterization data 316 at a site of a manufacturer of a receiver incorporating the ADC. In such embodiments, the storage device 310 may maintain one or more lookup tables storing the ADC characterization data 316, which data may be based on an assumed performance, an upper-bound (e.g., worst-case) performance, or an average performance, in relation to the transceiver parts and configuration in a prototypical transceiver, and/or may be based on initial or periodic measurements of a prototypical ADC. Yet further alternative embodiments may include implementing the characterization mechanism 302 on each individual radio, and characterization data is obtained for the specific radio and stored thereon. During or after manufacture, the characterization signals may be injected into the ADC (via the antenna, at the appropriate carrier frequencies, or through a port or test-bed connection to the IF stage), and the spurs may be measured (via FFT, or other utilities) using external test equipment, or alternatively using maintenance/setup utilities operating on the transceiver processor(s). In the various embodiments, the ADC characterization data 316 may be accessed in the future when the receiver is in the field (e.g., in operational commercial use) as discussed in describing FIGS. 1 and 2. In this case, ADC characterizations may be performed periodically to account for other effects (e.g., temperature drift, voltage variations, aging, etc.).

The digital receiver shown in FIG. 1 relies on frequency domain analysis of strong signals in the digital receiver front-end to ascertain if predicted blocking spur signals from ADC sampling may interfere with desired signals in the digital receiver. Though some embodiments are directed towards compensating for distortion due to ADC sampling, other embodiments may also be used to compensate for other non-linearities introduced by other receiver components such as a mixer. If the embodiments determine that there are blocking spur signals falling within the desired channel, corrective action, such as frequency adjustment of the one or more oscillators in the digital receiver, may be taken in the digital receiver to reduce the interference.

Figure 4:
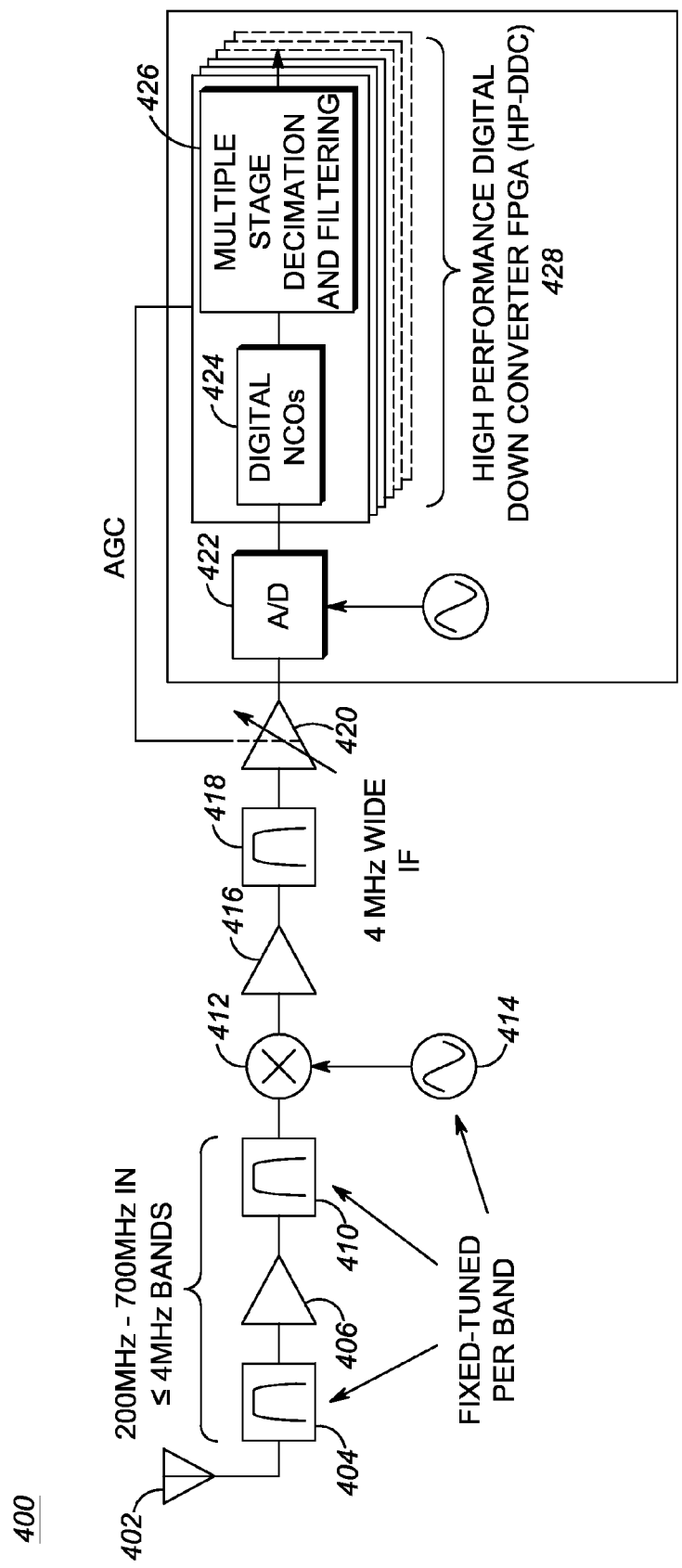
FIG. 4 is a functional block diagram of a wideband multi-carrier receiver system according to embodiments of the disclosure.

FIG. 4 is a functional block diagram 400 of an example wideband multi-carrier receiver system. The receiver system 400 includes an antenna 402, filters (404 and 410), amplifiers (406 and 416), and an intermediate frequency (IF) band filter 418. Further components include a local oscillator 414 and mixer 412. The antenna 402 receives an input signal that is passed through the filters (404 and 410) and amplifier (410) to the mixer 412. The local oscillator 414 provides a signal to the mixer 412. Further, the mixer 412 operates on the input signal (e.g., via heterodyning) to generate an intermediate frequency signal having a bandwidth containing a plurality of channels, each channel having a channel signal at a channel frequency. Additional receiver components include an automatic gain control (AGC) amplifier 420, a high performance ADC 422, and digital downconverters (consisting of NCOs 424 and decimation and filtering mechanisms for each channel 426). The NCOs 424 and multi-stage decimation and filtering mechanisms 426 may be implemented in a DSP, FPGA, or other signal processing technology for multiple channels 428.

Embodiments of the receiver shown in FIG. 4 may be in land mobile or cellular radios to receive multiple simultaneous voice or data channels. Persons of ordinary skill in the art would understand that the filters (404 and 410) are part of analog wideband selectivity that is traditionally provided in the receiver front-end, which limits the signal levels of out-of-band blocking signals. The intermediate frequency signal is filtered through a bandpass filter 418 and amplified with a gain, at AGC amplifier 420, that is determined by an automatic gain control (AGC) to keep the IF signals within the operating range of the ADC 422, as is known to those skilled in the art. For example, a fast-attack AGC as is known in the art to prevent the ADC from clipping on strong signals. The filtered and amplified intermediate signal is then sampled by the ADC 422. The sampled ADC output signal has a plurality of desired channel frequencies, each corresponding to a voice or data channel. The output of each digital NCO 424 is typically mixed with the corresponding desired channel signal to translate the desired channel signal to a baseband frequency. Further, the desired channel frequency is filtered and down-sampled by a multiple-stage decimation and filtering mechanism 426. However, the non-linear distortion introduced by the ADC 422 and the aliasing of that distortion due to sampling by the ADC may introduce interfering blocking spur signals that reduce the quality of one or more desired channel signals. Thus, an adjustment mechanism may be used to reconfigure the frequency of the local oscillator 414 and/or NCOs 424 to reduce the blocking spur signals interfering with the one or more desired channel signals.

Figure 5:
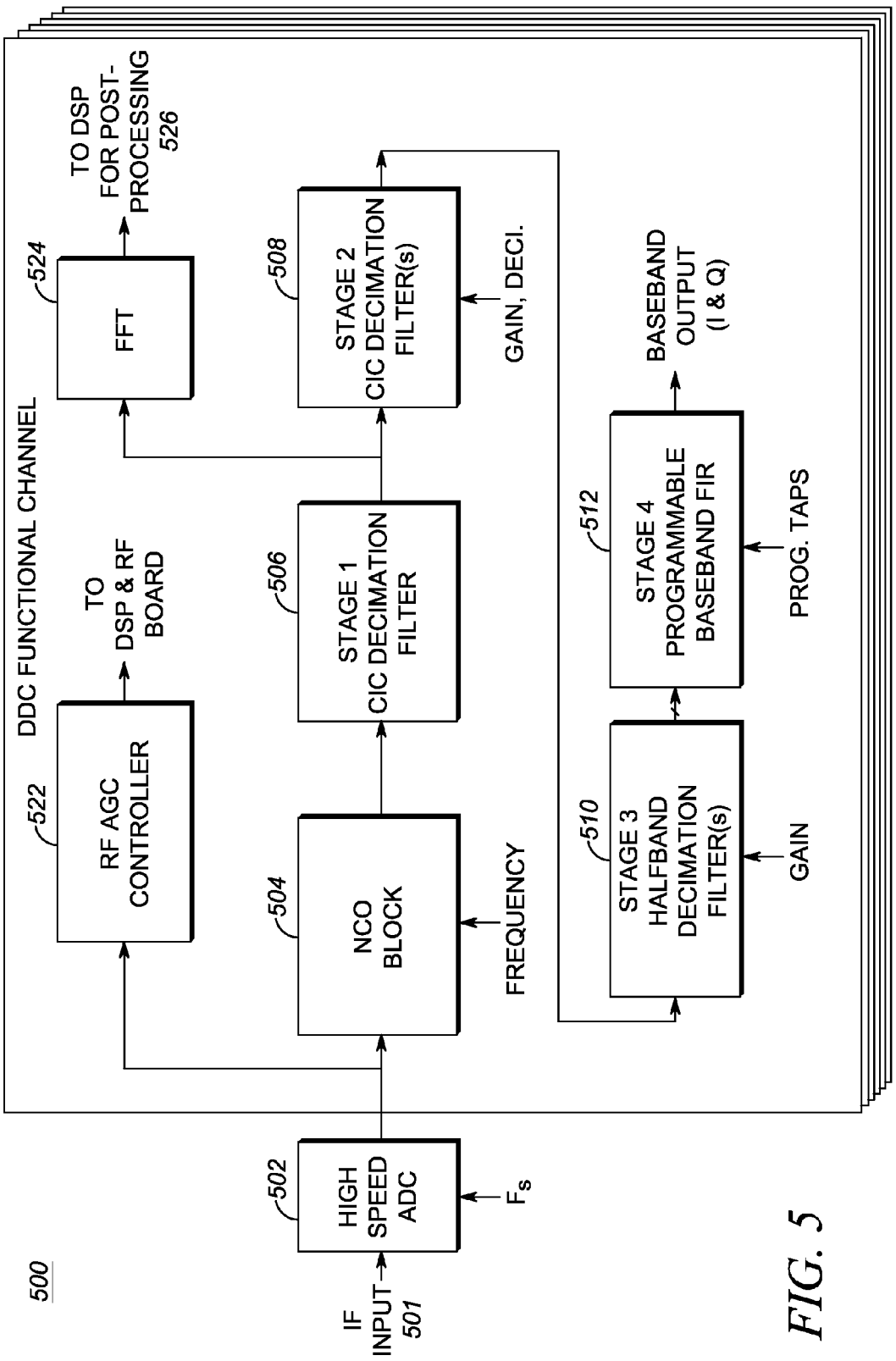
FIG. 5 is a functional block diagram of a digital signal processing portion of the multi-carrier receiver system according to embodiments of the disclosure.

FIG. 5 is a functional block diagram 500 of one transceiver embodiment utilizing a digital signal processing portion of a multi-carrier receiver system, such as the multi-carrier receiver system 400. The multi-carrier receiver system depicted in FIG. 5 includes an example NCO block 504, such as digital NCOs 424, several decimating filters (506, 508, and 510), such as the multi-stage decimation and filtering mechanism 426, and an RF AGC controller 522. An IF signal 501 is received and sampled by a high speed A/D 502, such as ADC 422, to produce a digitized wideband IF signal that is provided to a first decimating filter 506 after a frequency translation with a digital LO provided by NCO block 504. In an embodiment, real-time analysis of a wideband multi-carrier signal is performed by computing a FFT on a decimated digitized wideband IF signal output by decimating filter 506 at a relatively high rate (e.g., a 2,000 point FFT, at an FFT block 524, every 250 microseconds (us), covering at least the wideband receiver bandwidth). The FFT 524 computation is typically performed in a digital signal processing FPGA for efficiency. Note that the exact mixture and location of decimation, NCO, and FFT blocks is implementation specific, and does not alter the basic functionality of the approach. The FFT results (or a smaller set of pre-sorted or filtered version of the output results) may be sent to a general purpose DSP/processor for further analysis and processing.

Spectral characteristic data of the output of ADC 502, which in this embodiment are represented by the FFT 524 output, are analyzed for strong blocking signals that may cause distortion in the form of blocking spur signals falling within the desired channel or other receiver (e.g., mixer) non-linearities that may cause harmonically related spur signals in the sampled intermediate frequency signal by the ADC 502. In some embodiments, only relatively strong signals (e.g., desired signals, blocking signal, and blocking spur signals) need to be analyzed. In general, any signal other than desired signal(s) that are above a predetermined signal level threshold may be characterized as a blocking signal. However, there are situations where there is more than one desired signal, and thus a strong desired signal can also act as a blocking signal if it causes the ADC 502 to generate an aliased harmonic that falls on-channel with a weak second desired signal. In further embodiments, the threshold may be altered based on the signal level of the desired signal. For example, the threshold used to characterize a blocking signal may be decreased in the case of a desired signal having a relatively low power level. In some embodiments, the decrease in the threshold may be linear with respect to the difference between a desired signal level and a nominal desired signal level.

Note that in embodiments where only relatively strong signals need to be identified, precision requirements in the determination and processing of the spectral characteristic data (e.g., the FFT analysis) may be reduced, thereby reducing implementation costs (e.g., in some embodiments, only 8-bit FFT magnitude results may be sufficient).

Figure 6:
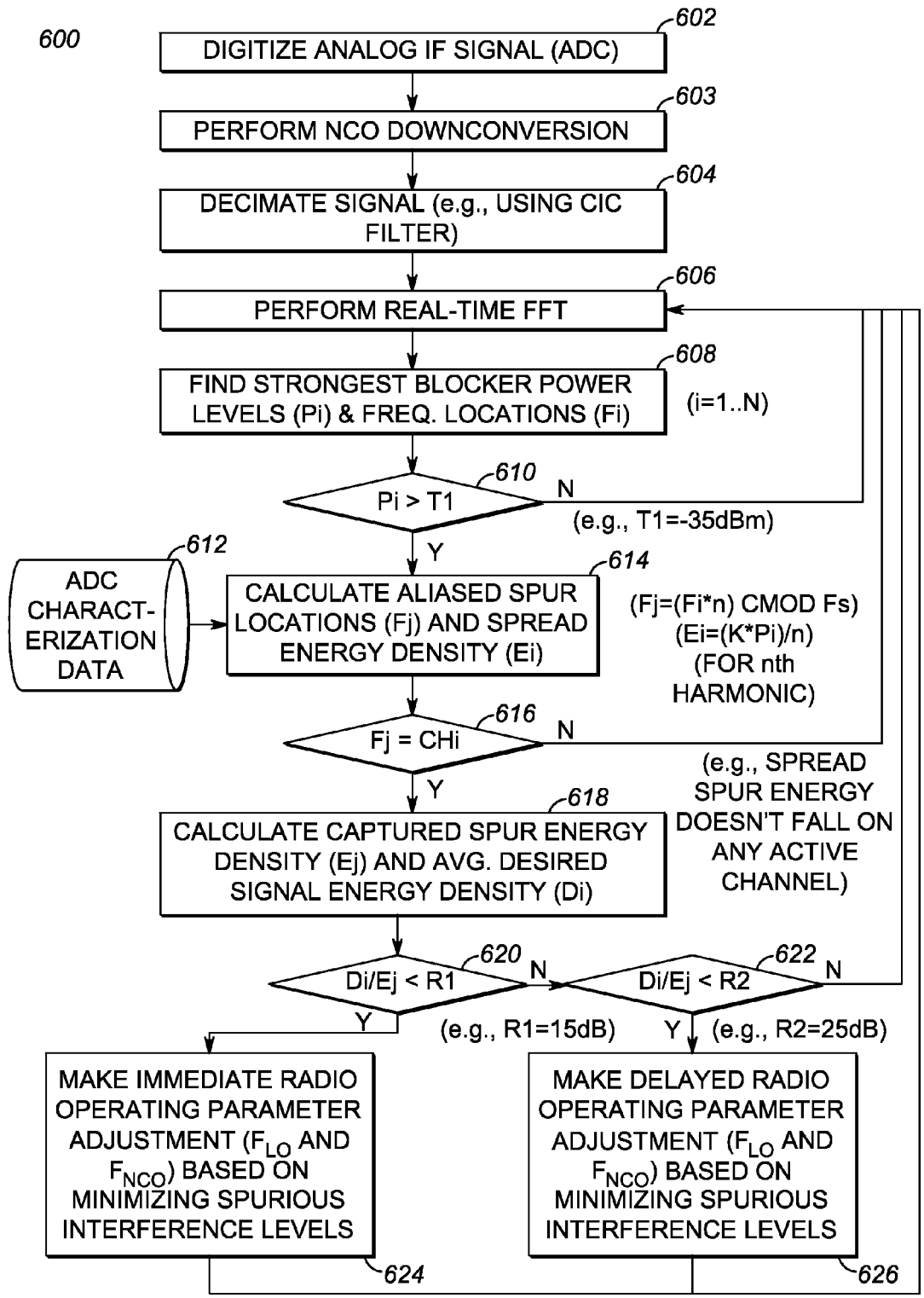
FIG. 6 is a flowchart of a method to improve signal quality in a receiver according to embodiments of the disclosure.

Referring now to FIG. 6, a flowchart 600 is provided that illustrates an example method performed by a receiver, such as receiver 100, to improve signal quality in the receiver. As shown in the flowchart, the analysis and processing of the method takes into account strong blocking signals and corresponding frequencies, ADC sampling rate, spur harmonic order and bandwidth, as well as desired signal level and target operating SINAD ratios. If blocking spur signals from ADC non-linearities fall onto a relatively weak desired signal, other combinations of the local oscillator (LO) frequency and digital NCO frequencies are analyzed to find a combination that minimizes or reduces distortion/interference to all of the desired channel signals in the multi-channel receiver. The receiver may then adjust the frequency of the LO and/or NCOs to mitigate the interference (which can typically be performed on the order of a millisecond and does not appreciably impact the desired channel signals).

A step in the example method may include digitizing or sampling the intermediate frequency signal by an ADC, such as ADC 108, as shown in block 602. Further, one or more NCOs, such as NCOs 112, may be used to translate a selected portion of the sampled intermediate signal to a baseband frequency, as shown in block 603. In addition, one or more decimation filters, such as may be included in digital downconverter 110, may reduce the sample rate of the baseband signal, as shown in block 604. A frequency analysis module, such as frequency analysis module 204, performs frequency analysis on the input signal (for example, it may perform an FFT operation on the sampled and downconverted intermediate signal, as shown in block 606). An interference assessment module, such as interference assessment module 206, for example, a programmed processor or DSP, processes and analyzes the FFT to identify a blocking signals and corresponding blocking spur frequencies and levels, as shown in block 608. Note that higher order spurious harmonics will generally spread out in frequency by an amount directly related to the harmonic order, reducing their corresponding interfering signal levels (or power spectral density) within the receiver channel bandwidth. If the FFT analysis determines that no strong blocking signals (e.g., greater than −35 dBm (threshold T1)) are present within bandwidth of the receiver, then no specific corrective action, such as oscillator frequency adjustment, needs to be taken, as shown in block 610.

Further steps in the example method include the adjustment mechanism, and more particularly the interference assessment module, for example, a processor or DSP implementing the interference assessment module, calculating or determining whether the blocking harmonic signals alias to a location (based on ADC sampling rate and desired channel signal frequencies) where the aliased bandwidth of the blocking harmonic signal interferes with a relatively weak desired channel signal, as shown in block 616. That is, if one or more blocking signals generate spurious signals that fall onto or substantially near a desired channel signal, further analysis is then performed as described. The energy of the expected harmonic or spur signals can be predicted by accessing then processing and analyzing ADC characterization data by the processor or DSP, as shown in block 612.

Additional steps may include determining, by the adjustment mechanism, and more particularly the interference assessment module, and again, for example, by the processor/DSP implementing the interference assessment module, corrective action to be performed if the affected desired channel signal is below a predetermined relative threshold based on SINAD ratios. For example, if a ratio of a desired channel signal level to a total of interfering spur signal level, where the ratio is R1=15 dB, as shown in block 620, then the processor/DSP provides instructions immediately (e.g., within one millisecond) to adjust the frequency of the local oscillator and/or NCOs, as shown in block 624. However, if for example, a ratio of a desired channel signal level to a total interfering spur signal level, where the ratio is R2=25 dB, as shown in block 622, then the processor/DSP provides instructions to make a delayed adjustment (e.g., when the receive packet burst is complete or receiver is idle) of the frequency of the local oscillator and/or NCOs, as shown in block 626.

Figure 7:
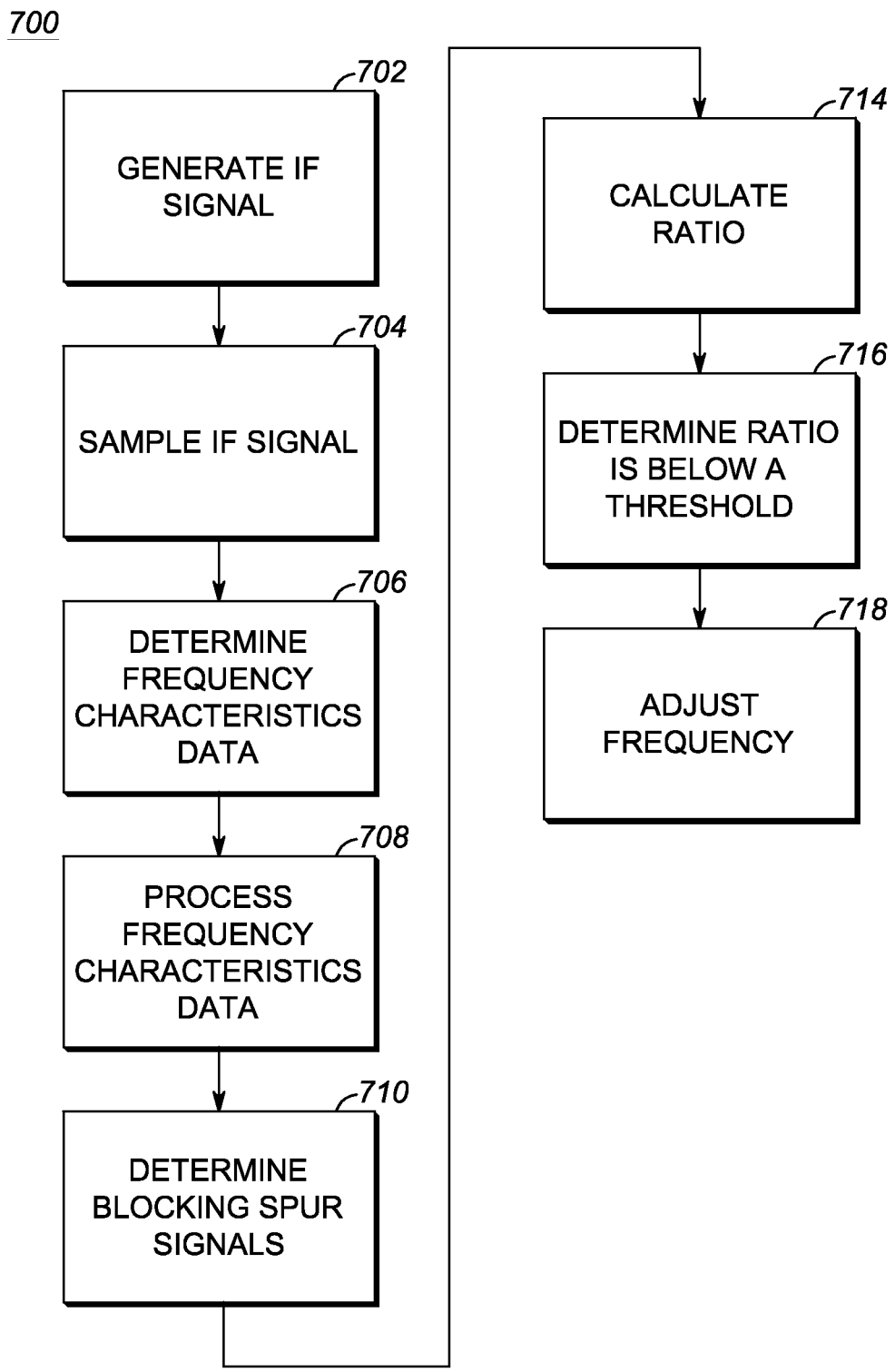
FIG. 7 is a flowchart of another method used in a receiver according to embodiments of the disclosure.

FIG. 7 is a flowchart of another method 700 performed by a receiver, such as such as receiver 100, to improve signal quality in the receiver according to embodiments of the disclosure. The example method 700 includes at block 702 generating an intermediate frequency (IF) signal, for example, at mixer 104. The IF signal may have a bandwidth containing a plurality of channels, including a desired channel signal at a desired channel frequency. Further, the IF signal may be generated by a mixer heterodyning or modulating a receiver input signal and a signal from a local oscillator of the receiver. The method may additionally include an ADC, for example, ADC 108, sampling the IF signal to provide an ADC output signal, as shown in block 704. The method may further include determining, for example, by frequency analysis module 204 of adjustment mechanism 111, spectral characteristic data of the digitized output signal of the ADC, as shown in block 706. The ADC may introduce distortion to the signal due to non-linear properties. An example set of spectral characteristic data may be obtained by performing an FFT of the digitized ADC output signal, or a similar representation of the sampled wideband IF signal. The method may also include processing spectral characteristic data to identify one or more blocking signals and corresponding blocking signal frequencies, as shown in block 708.

The method further includes determining, for example, by interference assessment module 206 of adjustment mechanism 111, one or more blocking spur signals, as shown in block 710. Each blocking spur signal will have a blocking spur level and corresponding blocking spur frequency based on the one or more blocking signals and ADC characterization data. A DSP may access the ADC characterization from a look-up table stored in a memory device. Alternatively, the ADC characterization data may be stored in one or more look-up tables, each look-up table having ADC characterization of a harmonic of a blocking spur signal.

The method also includes calculating, for example, by interference assessment module 206 of adjustment mechanism 111, a ratio of a desired channel signal level to a total interfering spur level, as shown in block 714. The ratio may be a signal to noise interference and distortion (SINAD) ratio that can be one metric of the performance of the ADC in particular and the receiver, generally.

The method further includes determining, for example, by interference assessment module 206 of adjustment mechanism 111, whether the ratio is below a first threshold (such as 15 dB), as shown in block 716. The method may also include adjusting, for example, by adjustment mechanism 111, the frequency of one or more oscillators of the receiver based on the ratio being below the first threshold, as shown in block 718. Moreover, the frequency adjustment of the one or more oscillators may be based on harmonic order of each of the one or more blocking spur signals that fall within the desired channel.

Alternative embodiments of the method may include identifying, by interference assessment module 206 of adjustment mechanism 111, one or more interfering spur signals by determining whether any blocking spur frequencies are substantially similar to the desired channel frequency. Each interfering spur signal has an interfering spur level and the total interfering spur level is the sum of each interfering spur level. The following equation shows an example ratio of the desired channel signal level $E_{ch\ i,\ desired}$ to be the desired channel signal energy and the total interfering spur signal level $E_{ch\ i,\ spurious}$ to be the total energy of the spur signals. If the ratio is below a first or second threshold R1 and R2, respectively, then corrective action as disclosed may be taken.

$$E_{ch\ i,\ desired}/E_{ch\ i,\ spurious} < R1\ \text{or}\ R2$$

Note that the interference energy captured in the desired receiver channel bandwidth should be considered in this ratio, and that higher order harmonics of modulated signals have their energy spread over a wider bandwidth (roughly proportional to the harmonic order). The actual threshold ratios (R1 and R2 above) utilized for making adjustments should also take into account the required SINAD ratios for the chosen modulation and signaling rates (since more robust modulations can tolerate higher levels of interference), as well as expected channel conditions. The measured average signal levels for each operating channel are then applied to those ratios to determine when spurious energy becomes harmful, and tuning action is required (immediately or less urgently). Note that the estimated desired signal level (or energy) for each multi-carrier receive channel is typically determined at high precision in the back-end DSP demodulation processing. Alternatively, higher precision FFT analysis could be performed in the FFT stage if desired.

Multi-carrier receiver channels with strong desired signals present may never need special adjustments to receiver operating frequencies, because it is unlikely that the ADC distortion products would ever become significant enough to cause errors. It may be beneficial to minimize operating frequency changes as described in order to maintain the highest level of communications reliability (e.g., for mission critical links). Generally, if any one of the receiver channels is negatively impacted by spurious distortion, the receiver operating frequencies for all of the channels may need to be adjusted, since they share a common analog LO frequency which determines the center of the wideband receiver window in frequency. The LO is utilized for block down-conversion, and each NCO is utilized to tune individual desired channels. Thus, a corresponding offset adjustment to each NCO channel may be performed whenever the LO is changed, to maintain the same operating frequencies on each channel.

Typically, worst case estimates are utilized for the captured interference energy and required SINAD ratios (e.g., R1~15 dB). Worst case desired signal level estimates may also be utilized. As an example of the algorithm, if a strong blocking signal is causing aliased harmonic energy to be captured at effectively −120 dBm in a particular desired receiver channel bandwidth (for a currently active/tuned channel), and the desired signal level for that channel is averaging ~−115 dBm, then an adjustment may be performed relatively quickly to the radio operating parameters (i.e., LO and NCO frequencies) to maintain desired receiver performance. If the ratio between desired and interfering signal components is higher (e.g., 20 dB), but still below the second threshold ratio (e.g., R2~25 dB) then no immediate action needs to take place, though the channel may be evaluated for less urgent radio operating parameter adjustments (i.e., after packet reception is complete, or the desired channel or channels go idle). The decision threshold ratios (R1 and R2) should also include any other desired system margins, and are generally programmable.

The time-history of strong blocking signals can also be analyzed at a given site to choose the best LO and NCO frequency combinations that avoid blocking spur signals to fall on the desired channel signals. Such time-history may be gathered over seconds, minutes, hours, days or weeks, to establish the probability and frequency locations of strong blocking signals. In general, the time-history is gathered for a particular location, and may result in finding a set of possible LO and NCO frequencies to avoid interfering blocking spur signals (such that a secondary LO could be predictively pre-tuned to that secondary operating frequency to minimize switching time). In addition, the set of possible LO and NCO frequencies is useful for field engineers in configuring base station sites (as it is typically manually measured with test equipment).

The resulting level of the blocking spur signals (due to non-linearities of an ADC such as ADC 108) can be predicted from known ADC performance characterization data (as fully described in the present disclosure), or may be measured and calibrated at a manufacturer site (e.g., to better account for part and temperature variations). For example, a strong ADC input signal at some input frequency $f_1$ is typically known to reliably produce a spur signal at an aliased frequency $f_2$ at some signal level relative to the input tone (e.g., −95 dBr), which is typically taken into account in the multi-carrier receiver based on the strong signals that are measured by an FFT. The analysis should also take into account the harmonic spread of blocking spur signals that fall within the desired channel (which is directly proportionally related to its respective harmonic order, n), as well as the fraction of the energy captured in the receiver's channel bandwidth, which is dependent on the receiver's channel or matched filter. The ADC can also be characterized for multiple tone spur (e.g., two or three-frequency) response, and this information can be stored for spur response prediction in the DSP. Note, however, that having more than one strong blocking signal present in a desired signal frequency range may be rare (<0.01%) in some embodiments. Thus, a majority of blocking spur signals are typically due to a single strong blocking signal.

As mentioned in the present disclosure, higher order harmonics of the blocking signal typically spread out proportionally in frequency. For example, if a strong blocking signal is present, and a corresponding $5^{th}$ harmonic is known to fall near a desired signal frequency through aliasing in the ADC, such as ADC 108, the harmonic energy is spread over roughly five times the bandwidth of the blocking signal with a corresponding (5 times or 7 dB) reduction in spur energy over the blocking spur signal bandwidth due to the spreading of spur energy. Similarly, when making frequency adjustments to the local oscillators, such as LO 106, each channel that the receiver is tuned by the adjustment mechanism results in a 5 times frequency adjustment in the $5^{th}$ harmonic blocking spur signal location, the direction of which depends on which Nyquist zone the harmonic would fall, as discussed in the present disclosure. Thus, even small changes in receiver LO frequency (and the corresponding changes in NCO frequencies) can result in dramatic shifts in location of blocking spur signals. The effects of any such changes can be evaluated for all active received channels (such that frequency adjustment of a blocking spur signal from one desired channel signal frequency does not cause the blocking spur signal to fall on another relatively weak desired channel signal frequency). In cases where the blocking spur signals cannot be completely moved away from all desired channel signal frequencies, the weakest relative blocking spur signal (e.g., the highest order blocking harmonic signal or strongest desired signal) should be chosen.

Alternative embodiments may have an interference assessment module, such as interference assessment module 206, analyze and process ADC characterization data, such as ADC characterization data 214 associated with ADC 108, and calculate a candidate or potential frequency delta based on the harmonic order of strong blocking spur signals falling within the desired channel. For example, understanding that a blocking spur signal is of $5^{th}$ harmonic order, the interference assessment module is configured to calculate that a frequency adjustment of potential frequency delta of an oscillator results in the blocking spur signal to shift five times the potential frequency delta. Programming the interference assessment module in such a way may result in smaller frequency adjustments to an oscillator but still reduce the interference due to spur signals.

Figure 8:
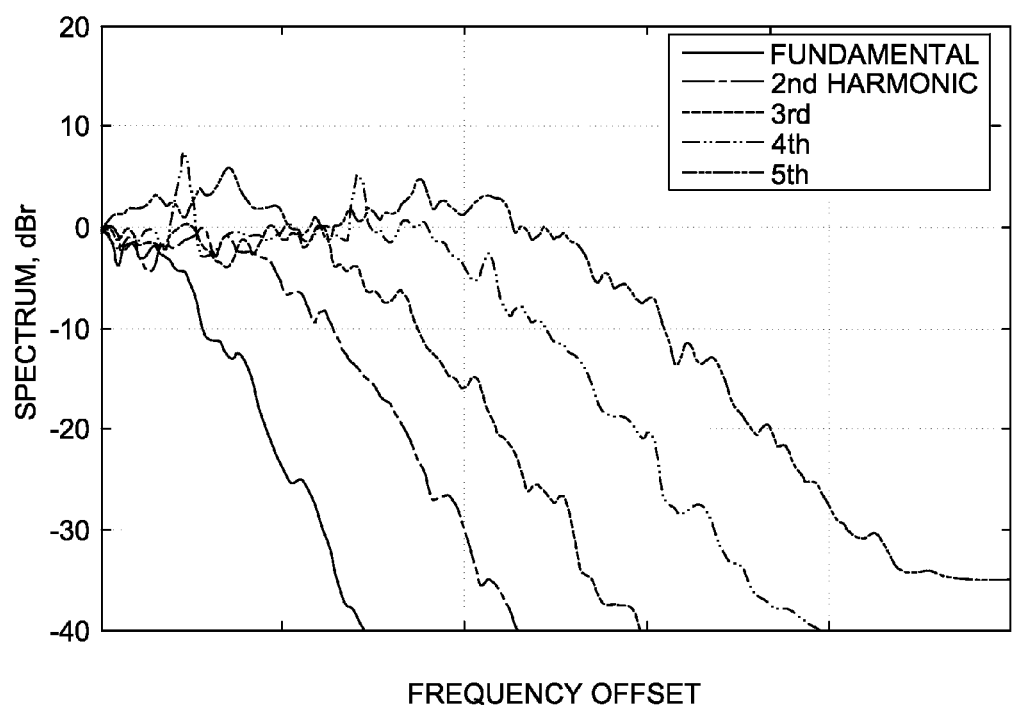
FIG. 8 is a chart showing harmonic spread of modulated blocking spur signals according to embodiments of the disclosure.

As described above, the aliased signal harmonic increases in order, the apparent spreading of such a signal may also increase proportionally to the harmonic order k. Thus, a strong signal that normally appears with a bandwidth of B will appear with bandwidth (k*B) for a $k^{th}$ harmonic. Such an effect is illustrated in FIG. 8 for different normalized harmonics of a continuous phase modulation. Because the harmonic signal energy is spread over a wider bandwidth, there is generally a corresponding reduction in the captured harmonic signal energy in the receiver's channel bandwidth. For example, a narrowband receiver channel filter may only span about 5.5 kHz, which approximately matches the bandwidth of the modulation. The $3^{rd}$ harmonic of modulation will have a bandwidth of about 16 kHz, meaning that the 5.5 kHz receive filter captures about 5 dB less power than a first order harmonic signal. Such an effect increases with harmonic order, generally making higher order harmonics less of a performance concern to the receiver. That is, if the blocking spur signal is a higher harmonic of the blocking signal, then the blocking spur signal level is proportionally smaller and thus the ratio of the desired signal level to blocking spur signal level is increased.

The frequency location of the harmonics is determined through aliasing theory. Depending on the Nyquist zone in which an ADC, such as ADC 108, is being operated, the frequency and movement of blocking spur signals may change. The equation for the aliased frequency can be related to the input frequency (the receiver intermediate frequency $f_{IF}$) and the ADC clock frequency $F_{clk}$ through the equation:

$$f_{aliased} = \left| f_{IF} - F_{clk} \text{round}\left(\frac{f_{IF}}{F_{clk}}\right) \right|.$$

As an example, for $f_{IF}$=32.5 MHz and $F_{clk}$=40 MHz:

$$f_{aliased} = \left| 32.5 - 40 \cdot \text{round}\left(\frac{32.5}{40}\right) \right| = 7.5 \text{ MHz}.$$

In a similar way the aliased frequency of a $k^{th}$ harmonic can be expressed as:

$$f_{aliased} = \left| k \cdot f_{IF} - F_{clk} \text{round}\left(\frac{k \cdot f_{IF}}{F_{clk}}\right) \right|.$$

For a $5^{th}$ harmonic of $f_{IF}$ using the above example:

$$f_{aliased} = \left| 5 \cdot 32.5 - 40 \cdot \text{round}\left(\frac{5 \cdot 32.5}{40}\right) \right| = 2.5 \text{ MHz}.$$

Depending on whether the receiver RF conversion is high-side or low-side injected and which Nyquist zone $N_Z$ is used in the ADC, a desired positive change in $f_{aliased}$ may require an increase or decrease in the frequency of the LO. The movement of the desired aliased IF out of the ADC can be expressed as:

$$\Delta f_{aliased} = (-1)^{N_Z[RF/LO]} \Delta LO$$

where $N_Z = \lceil 2f_{IF}/F_{CLK} \rceil$, where "⌈ ⌉" indicates the ceiling function (equal to the smallest integer greater than the argument). As an example, if the radio is high-side injected and the IF is in the second Nyquist zone, [RF/LO]=1, $N_Z$=2, and $(-1)^3=-1$, so an increase in LO of $\Delta LO$ results in a decrease of the aliased IF of $-\Delta LO$. For a $k^{th}$ harmonic:

$$\Delta f_{aliased} = (-1)^{N_{Z,k}+[RF/LO]} k \cdot \Delta LO,$$

where $N_{Z,k} = \lceil 2kf_{IF}/F_{CLK} \rceil$. A $5^{th}$ harmonic of 32.5 MHz (=162.5 MHz) would be in the $9^{th}$ Nyquist zone for a 40 MHz ADC clock so for high side injection the aliased IF of the $5^{th}$ harmonic would change by $(-1)^{9+1} 5\Delta LO = +5\Delta LO$.

While the captured energy levels of the harmonics change based on harmonic order, the harmonics relative level to the fundamental strong signal is also highly dependent on the internal ADC architecture, and is obtained in the ADC characterization data, such as ADC characterization data 214. The interfering blocking spur signal level (which causes interference to the desired signal) can be estimated based on relative harmonic spur signal levels produced in the ADC by a given blocking signal, and other characteristics of the signal. First, an aliased blocking harmonic spur frequency and spread (for the $k^{th}$ harmonic) is calculated based on the above formulas. The center frequency of the aliased $k^{th}$ harmonic (in Hertz) is calculated as:

$$f_{aliased} = \left| k \cdot f_{IF} - F_{clk} \text{round}\left(\frac{k \cdot f_{IF}}{F_{clk}}\right) \right|.$$

The aliased harmonic blocking signal bandwidth spread can generally be estimated as $k^* B_{BL}$ (where $B_{BL}$ is the blocking signal bandwidth). Note that complex blocking signal modulations and complex non-linearities may result in more complex blocking signal spreading effects. If there is overlap of the frequency range of blocking harmonic signals with the desired channel signal frequency (i.e., if the harmonic frequency of the blocking signal falls within the desired channel signal bandwidth, or its center frequency, $f_{aliased}$ is approximately within $(k^* B_{BL}/2)$ Hertz of the desired signal center frequency), the relative captured energy in the receiver channel bandwidth for that interfering blocking spur signal is generally computed as:

$$RBL = 10 \log [NBD/(k^*BBL)],$$

where $NB_D$ is the equivalent noise bandwidth of the desired channel filtering in the receiver. Other estimates of these quantities are possible (e.g., setting $NB_D$ equal to the symbol rate of the desired signal).

Figure 9:
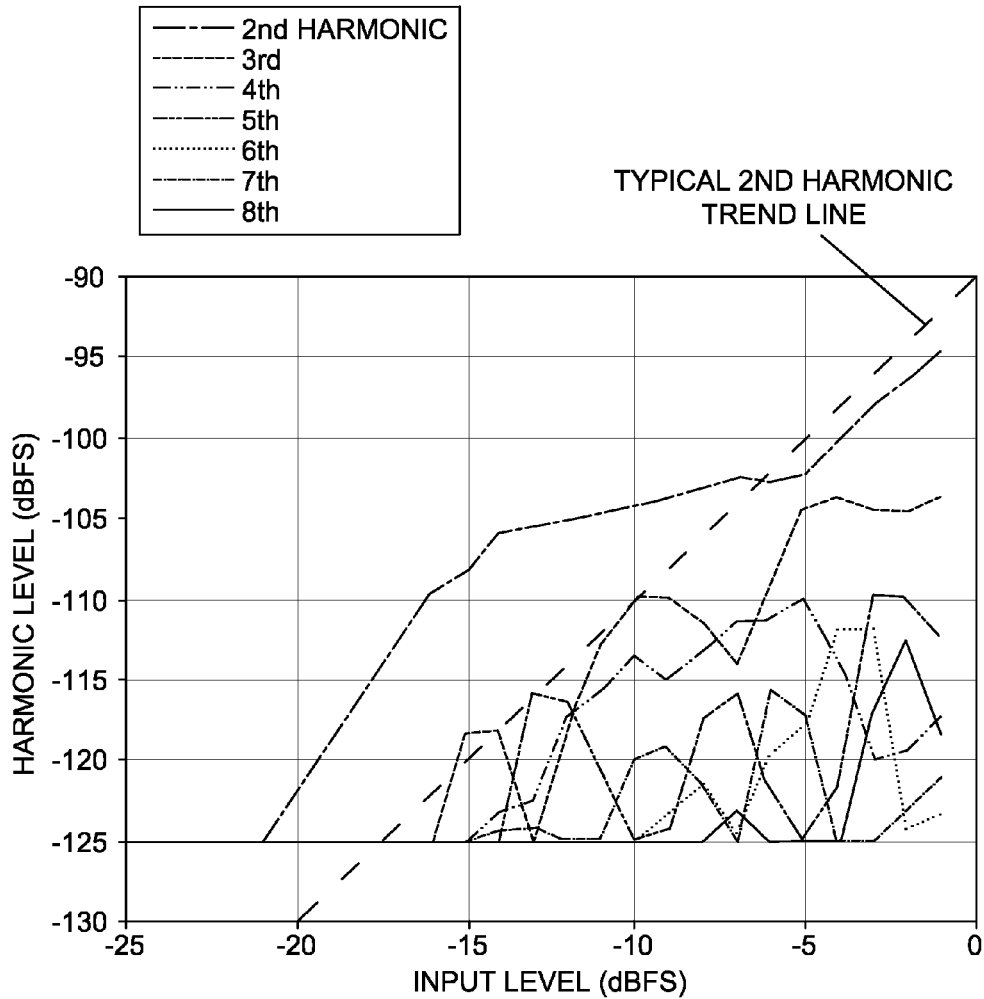
FIG. 9 is a chart of ADC blocking harmonic signal levels according to embodiments of the disclosure.

The interfering blocking spur signal level ($P_{BL}$) is generally measured by analyzing the FFT of the ADC output signal, and may be additionally averaged or filtered to refine the estimate. Likewise, the desired signal level ($P_D$) can be measured by processing the FFT, or determined in typical demodulation processing and filtering (e.g., at the output of the channel matched filter). The ADC can typically greatly attenuate the aliased blocking signal energy, generally by a factor of $A_k$ (expressed in dBr for the $k^{th}$ harmonic) as shown by way of illustrative example in FIG. 9. These values are often specified (at least in part) on ADC data sheets. The attenuation values are generally dependent on the ADC itself. Thus, the receiver captured blocking power level ($P_{BL}$, typically expressed in dBm) for the aliased harmonic blocking signal (or desired signal interference) is the original blocking power $P_{BL}$ reduced by the ADC spur rejection $A_k$ and the bandwidth factor $R_{BL}$:

$$P_{BL}(P_{BL}+R_{BL}+A)$$

The ratio ($R_D$) of the desired signal power ($P_D$, typically measured in dBm) to the interfering aliased blocking signal power is:

$$R_D = (P_D - P_{BL}).$$

When channel noise power ($P_N$, typically measured in dBm) is included in the interference term, the ratio expresses the SINAD ratio ($R_D$) for the desired signal (measured in dB):

$$R_D = (P_D - P_{BL} - P_N).$$

Note that signal energies may be used in place of power levels without any loss of generality. These estimates generally need to be updated relatively quickly (e.g., to take into account different signal levels in different timeslots of a TDMA cellular system, or fading/shadowing of desired and blocking signals). Generally, the estimated SINAD ratio ($R_D$) is periodically compared against predetermined thresholds (e.g., R1 or R2) described above to determine if a LO and NCO frequency adjustment is necessary to alleviate the interference of aliased blocking signals. An example of a frequency change to avoid aliased blocking signal interference is given below.

Figure 10:
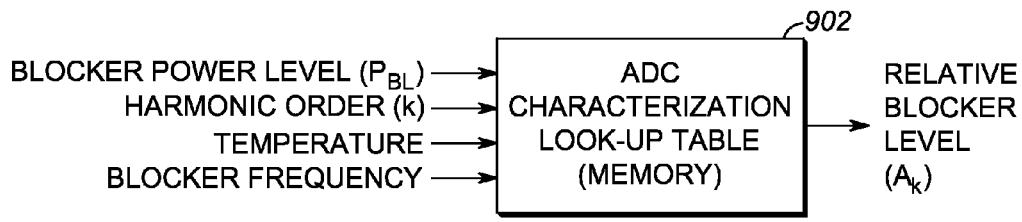
FIG. 10 is a functional block diagram of an ADC characterization look-up table according to embodiments of the disclosure.

As mentioned in the present disclosure, estimation of blocking harmonic spur signal levels can be further enhanced by performing a more detailed characterization of an ADC, such as ADC 108, (either a one-time calibration estimate for the ADC type used in a particular design, or an individual characterization of the particular ADC used in the receiver). The characterization of the ADC generally involves developing a table of relative ADC spur signals (i.e., the $A_k$ levels described above), which is typically based on the harmonic order (k), and a quantized blocking signal level ($P_{BL}$) at the ADC input. In some embodiments, these values may be stored in a storage device, such as the storage device 208, (e.g., in a look-up table) and accessed based on the measured blocking signal levels. In general, as many harmonics as desired may be characterized, though once relative harmonic spur levels fall below a predetermined level (e.g., −130 dBr), they may be ignored. Note that if certain blocking signal frequencies are attenuated (e.g., through analog filtering) before being sampled by the ADC, such signals may not need to be considered (or their effects may be reduced). Often times, the blocking signal level may be expressed in decibels relative to the ADC's full scale range (dBFS), which directly corresponds to a blocking signal level ($P_{BL}$) given a receiver gain. For example, using the formula above for the $k^{th}$ harmonic, and the relative blocking level (in dBm or dBFS), a relative blocking spur level (expressed in dBr or dBFS) can be stored and accessed in a look-up table (900 and 902) (see FIGS. 10 and 11) such as may be maintained by the storage device 208.

In general, the accuracy of the spur prediction method will improve with more entries in the table. Note that the upper bound (e.g., worst case condition) in a particular quantized signal range (e.g., −17.5 dBFS to −12.5 dBFS) may be stored in the resulting table. The accuracy of the method may be further improved by incorporating other input variables. More precise tables are readily possible that incorporate additional real time input variables, such as ADC operating temperature, voltage, and/or blocking signal frequency, may also be implemented to further refine the estimates, with no loss of generality. Those variables form additional inputs into the table, which vary based on the dynamic operating environment of the receiver.

The data stored in such a table is typically based off of characterization measurements for each harmonic and relative blocking signal power level of interest, such as those shown in FIG. 11. In general, these measurements only need to be made once for a particular ADC type. In more refined embodiments, these tables may be custom measured for each radio ADC (e.g., in a factory calibration process) to take into account part to part variations. Alternatively, these calibrations may be performed on a periodic basis (e.g., every few seconds) in the background to update the table values, and account for changes in the operating environment (e.g., operating temperature or voltage changes). These variables form additional inputs to the above described look-up table. Alternate embodiments may include the ADC characterization data to be stored in more than one look-up table. The look-up tables may be organized such that each look-up table includes ADC characterization data for each harmonic level of the spur signals.

Figure 12:
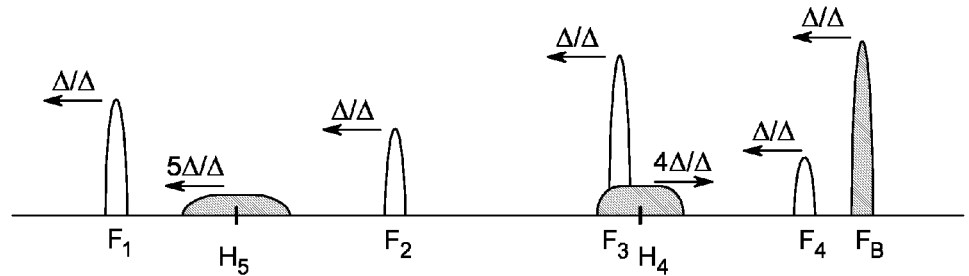
FIG. 12 is a chart showing an aliased desired signal and aliased blocking harmonic signals according to embodiments of the disclosure.

When target SINAD ratios are below the predetermined thresholds (e.g., R1 or R2), a LO and NCO frequency change may be necessary to move the aliased blocking harmonic signals out of the desired channel signal frequency. Knowing where the aliased desired signals and blocking harmonic signals fall and how they move in light of a change in the LO ($\Delta$LO), e.g., in LO 106, results in selecting an LO frequency change that maximizes the overall SINAD (for all channels). Consider the example shown in FIG. 12 with four desired signals and a blocking signal that is resulting in in-band $4^{th}$ and $5^{th}$ harmonic blocking signals. The desired signals are centered at $F_1$ through $F_4$, the blocking signal is at blocking frequency $F_B$, and the blocking harmonic signal at blocking harmonic frequencies $H_4$ and $H_5$. The magnitude and direction of the frequency movement is shown by the arrows, where e.g. '$\Delta/\Delta$' means the indicated signal moves a distance (in channel frequency) of $\Delta$ for an LO (e.g., LO 106) frequency change of $\Delta$. Note the blocking signal could be a strong desired signal (e.g. from another channel), though it is shown as an interferer in FIG. 12.

Figure 13:
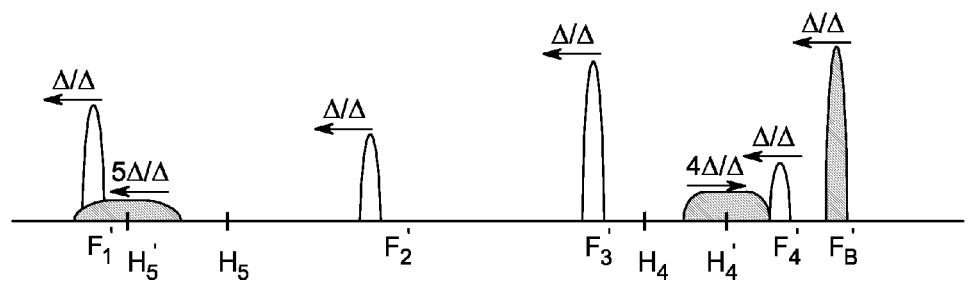
FIG. 13 is a chart showing an aliased frequency spectrum after a frequency adjustment of delta according to embodiments of the disclosure.
Figure 14:
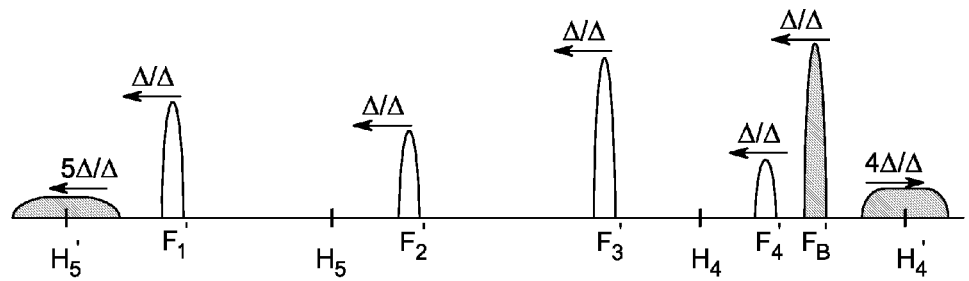
FIG. 14 is a chart showing an aliased frequency spectrum after a frequency adjustment of three times delta according to embodiments of the disclosure.

As the LO (e.g., LO 106) is tuned by $\Delta$, a gap will open up between $F_3$ and $H_4$ at a rate of $5\Delta$ ($F_3$ moves down by $\Delta$ while $H_4$ increases by $4\Delta$), while the gap between $F_4$ and $H_4$ will close at a rate of $5\Delta$. Likewise, the gap between $F_1$ and $H_5$ will close at a rate of $4\Delta$, while the gap between $F_2$ and $H_5$ will open at a rate of $4\Delta$. Note a negative $\Delta$ will change the sense of a gap (from e.g. closing to opening). Because the $H_4$ harmonic is colliding with the desired signal F3, an LO change may give better performance. FIG. 13 shows the resulting spectrum for an LO change of $\Delta$. This results in the $4^{th}$ harmonic moving off of $F_3$ and butting up against but not colliding with $F_4$, as depicted by $H'_4$. Meanwhile, the $5^{th}$ harmonic has moved over $F_1$ and matters have not improved. However, a change of $3\Delta$ (FIG. 14) will move both the $4^{th}$ and $5^{th}$ harmonics off all of the desired signals, giving an improved SINAD condition even if one of the desired signals should be shadowed or faded. Note it would be acceptable to move the aliased harmonics onto other active but undesired channels.

Figure 15:
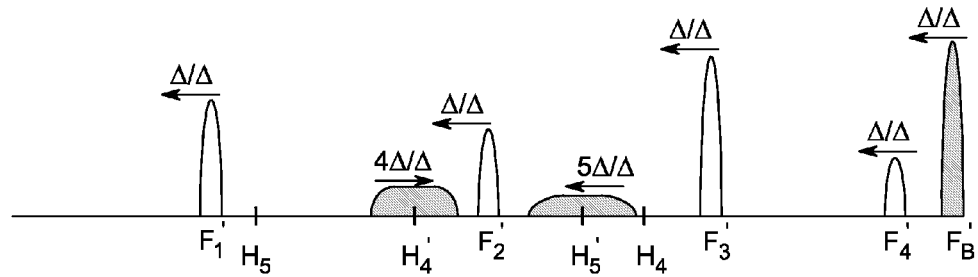
FIG. 15 is a chart showing aliased frequency spectrum after a frequency adjustment, which in the illustrated example is negative three times delta according to embodiments of the disclosure.

Similarly, a change of $-3\Delta$ also provides non-colliding harmonics as shown in FIG. 15. Because both frequency changes have a magnitude change of $3\Delta$, neither is preferred over the other. Generally the smallest frequency adjustment is desired because the excess bandwidth in the wideband receiver selectivity can then be kept to a minimum.

This process can be formalized by arranging the spectrum as a matrix of channels, where each column is a channel and each row is an aliased harmonic due to a given blocking signal. The content of this sparse matrix would be the power levels per channel due to desired, aliased harmonics, and noise terms. At a high level, this is an arrangement of row vectors D, $H_2$, $H_3$, etc.:

$$\begin{bmatrix} D \\ H_2 \\ H_3 \\ H_4 \\ \vdots \\ H_9 \\ N \end{bmatrix}.$$

Here D is a row vector of zeros except in indices where the channel index is occupied by a desired signal, where it would then be that channel's power level, e.g.:

$$D=[0 \ldots P_1 \ldots P_2 \ldots P_3 \ldots P_4 \ldots 0\ 0],$$

where '...' represents a string of zeros corresponding to unoccupied channels. The aliased harmonic vectors $H_k$ would be row vectors of the channels occupied by the aliased harmonic of the strong blocking signal, and the received power associated with each harmonic per channel bandwidth. Note that the aliased harmonic blocking signal power per channel ($P'_{BL}$) takes into account ADC non-linearities, such as of the ADC 108, as well as the harmonic spreading. For a $3^{rd}$ harmonic for example, three consecutive channels would be occupied by the estimated harmonic power captured in the receiver channel bandwidth (to account for the harmonic spreading) while all other columns would be zeros:

$$H3=[0 \ldots 0\ P'_{BL}\ P'_{BL}\ P'_{BL}\ 0 \ldots 0].$$

It is typically assumed that the harmonic blocking signal power is spread uniformly across multiple channels, though differing values may be utilized per channel to account for cases where the blocking signal energy is not spread uniformly.

Lastly the noise vector would typically be a row vector of thermal and environmental noise per channel, which may not be flat due to environmental noise and interference from neighboring systems.

As the LO (e.g., LO 106) changes, the row vectors shift left or right based on the $\Delta f_{aliased}$ equation sign and magnitude as detailed above. For the example described above where the $5^{th}$ harmonic moves at $+5\Delta$LO, the five consecutive channels in the $5^{th}$ harmonic row would shift right (i.e., increasing in frequency) by five channels for every channel of LO change. So for a given $\Delta$ change, the desired channel and harmonic channels are shifted according to the required magnitude and sign, and then only the columns containing desired channels in the first row are examined to determine a SINAD ratio, where the signal is the first element from the D vector and the noise and distortion is the (linear) sum of the powers in the aliased harmonic rows and the noise row. This shifting and analyzing process can be repeated iteratively starting with the minimum possible channel frequency changes of $\pm\Delta$ and increasing linearly in alternating sign per index until an acceptable solution is found. Note this iteration is only being performed on characterization data stored in the look-up table(s) (i.e., the LO is not actually tuning by $\pm\Delta$ during this phase but this is only done in the processor through analysis/processing). If no solution is found that eliminates harmonic spur signals from interfering with desired channel signals, the solution that gives the best (or highest) minimum SINAD is typically chosen. The end point for the frequency range of frequency adjustment would be receiver-design dependent on the excess bandwidth in the receiver selectivity (i.e., the algorithm must stop before one of the desired channels is moved into the transition band of the IF filter).

Note that when there is more than one strong blocking signal, depending on the IF bandwidth of the receiver, the higher order harmonics can sweep between two adjacent Nyquist zones, meaning the direction of motion can change for one blocking signal's harmonic compared to another blocking signal's harmonic. For example, for an IF centered at 32 MHz with 4 MHz BW and 40 MHz sample rate, the 5th harmonic can go from 5×30=150 to 5×34=170 MHz, while the boundary between the 8th and 9th Nyquist zones is at 160 MHz. In this case, the 5th harmonic aliases to a decreasing IF frequency over a lower portion of the IF band and aliases to an increasing IF frequency in the upper portion of the IF band. If there are two or more strong harmonics, there may need to be two or more rows of 5th harmonics to account for the fact that some may need to shift left while others shift right as the LO changes frequency. The same holds for other higher order harmonics. As another example, an 8th harmonic would sweep from 240-272 MHz, crossing from Nyquist zones 13 to 14 at 260 MHz.

In addition to the iterative approach just described, a range of $\Delta$s that avoid colliding harmonics can be determined analytically. In one embodiment, such an approach calculates the distance between a given desired tone and the aliased endpoints of an aliased harmonic. Knowing the magnitude and direction of the movement of the desired and aliased-band endpoints, equations representing the gaps between the two endpoint channels and the desired channel may be used. If one gap is positive and one negative, then the desired channel falls between the two endpoint channels, hence a collision. However, if the gaps are both positive or both negative, there is no collision (the harmonic term is either above or below the desired term, respectively). A product of the gaps for a given desired channel then is negative if there is a collision or positive if there is not. This product gives the equation for a parabola in $\Delta$. This convex parabola goes slightly negative over the range of $\Delta$s that result in collisions, but is positive on either side. For a set of desired signals, a set of parabolas results. When all of the harmonics have been accounted for, the union of the negative regions is the range of $\Delta$s that will result in harmonic collisions. From this point the minimum non-colliding $\Delta$ may be determined An example of the above alternative embodiment, consider a system with IF=32±2 MHz and Fclk=40 MHz that has four desired signals of 12.5 kHz channel spacing and bandwidth B=5 kHz at IF frequencies:

$F_1 = 33 + \Delta$ $F_2 = 32.8125 + \Delta$ $F_3 = 32.0125 + \Delta$ $F_4 = 31.7 + \Delta$ with a strong blocking signal at $F_b = 30.5625 + \Delta,$ where $\Delta$ is the dependence on the change $\Delta$ in the main LO (e.g., LO 106). With the 40 MHz sample clock, the ADC (i.e, the ADC 108) is being operated in its $2^{nd}$ Nyquist zone. The aliased IF frequencies (in MHz) are then:

$f_1 = 40 - (33 + \Delta) = 7 - \Delta$ $f_2 = 7.1875 - \Delta$ $f_3 = 7.9875 - \Delta$ $f_4 = 8.3 - \Delta$ $f_b = 9.4375 - \Delta.$ The harmonics of blocking signal $f_b$ alias to:

$2^{nd}: 2 \times (30.5625 + \Delta) \rightarrow H_2 = 61.125 + 2\Delta - 80 = 18.875 - 2\Delta$ $3^{rd}: H_3 = 11.6875 + 3\Delta$ $4^{th}: H_4 = 2.25 + 4\Delta$ $5^{th}: H_5 = 7.1875 - 5\Delta$ $6^{th}: H_6 = 16.625 - 6\Delta$ $7^{th}: H_7 = 13.9375 + 7\Delta$ $8^{th}: H_8 = 4.5 + 8\Delta$ $9^{th}: H_9 = 4.9375 - 9\Delta$ etc. Of the non-negligible harmonics of the blocking signal, only $H_5$ falls back within the desired aliased IF band of 6-10 MHz (=40−(32±2)). The gaps are computed as the frequency difference between the desired carrier and the band edges of the harmonic. The gap $g_{l,k}$ is the gap between the lower band edge of the harmonic and desired carrier k and the gap $g_{u,k}$ is the gap between the upper band edge of the harmonic and the desired carrier k. The gaps are computed for each carrier k=1 through 4. Note that the lower and upper edges of the $5^{th}$ harmonic with be at approximately 2.5× the bandwidth of 5 kHz away from the center of the harmonic (i.e., 25 kHz wide), or:

$H_{5,l} = 7.1875 - 5\Delta - 2.5 \times 0.005 = 7.175 - 5\Delta$ $H_{5,u} = 7.1875 - 5\Delta + 2.5 \times 0.005 = 7.2 - 5\Delta$ Additional safety margin could have been added here as a guard band between the aliased blocking signal harmonic and the desired by increasing the bandwidth multiple. For example, a factor of ±3.5× the 5 kHz bandwidth could have been used for the $5^{th}$ harmonic instead of ±2.5× to account for spectral roll-off as shown in FIG. 8. This factor is at the designer's discretion.

For desired carrier 1, the product of the gaps is:

$G1(\Delta) = g_{l,1} \times g_{u,1} = (7.175 - 5\Delta - (7 - \Delta)) \times (7.2 - 5\Delta - (7 - \Delta)) = (0.175 - 4\Delta)(0.2 - 4\Delta),$ which is the equation of a parabola in $\Delta$ which is negative between $0.04375 \leq \Delta \leq 0.05$ MHz, so this would be an excluded region for the value of $\Delta$, since it would mean that carrier 1 is falling between the two band edges of the $5^{th}$ harmonic over this range. Note the actual parabola doesn't have to be calculated, only the zero-crossing points of 0.175/4 and 0.2/4 MHz, between which is the excluded zone. These zero crossings can be easily calculated knowing the frequencies. Proceeding similarly for each carrier, the exclusion zones for $\Delta$ for this harmonic are:

$Z1(\Delta): 43.75 \leq \Delta \leq 50$ kHz $Z2(\Delta): G2(\Delta) = (7.175 - 5\Delta - (7.1875 - \Delta))(7.2 - 5\Delta - (7.1875 - \Delta)) = (-0.0125 - 4\Delta)(0.0125 - 4\Delta) \rightarrow -3.125 \leq \Delta \leq +3.125$ kHz $Z3(\Delta): G3(\Delta) = (-0.8125 - 4\Delta)(-0.7875 - 4\Delta) \rightarrow -203.125 \leq \Delta \leq -196.875$ kHz $Z4(\Delta): G4(\Delta) = (-1.125 - 4\Delta)(-1.1 - 4\Delta) \rightarrow -281.25 \leq \Delta \leq -275$ kHz Since LO change $\Delta$ must be in increments of the channel spacing 12.5 kHz, the smallest options that fall outside of exclusion zones are ±12.5 kHz. For the case of $\Delta = +12.5$ kHz, the new aliased IF frequencies are:

$f_1 = 6.9875$ MHz $f_2 = 7.175$ MHz $f_3 = 7.975$ MHz $f_4 = 8.2875$ MHz.

The aliased harmonic $H_5 = 7.125$ MHz$\pm 12.5$ kHz no longer interferes with any of the desired carriers $f_1$-$f_4$, now being centered 50 kHz away from $f_2$ and well away from the others.

The foregoing is illustrative only and is not intended to be in any way limiting. Reference is made to the accompanying drawings, which form a part hereof. In the drawings, similar symbols typically identify similar components, unless context dictates otherwise.

In general, it should be understood that the circuits described herein may be implemented in hardware using integrated circuit development technologies, or yet via some other methods, or the combination of hardware and software objects that could be ordered, parameterized, and connected in a software environment to implement different functions described herein. For example, the present application may be implemented using a general purpose or dedicated processor running a software application through volatile or non-volatile memory. Also, the hardware objects could communicate using electrical signals, with states of the signals representing different data.

It should be further understood that this and other arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location. Thus, the functional blocks, methods, devices and systems may be integrated or divided into different combinations of systems, devices, and functional blocks as would be known to those skilled in the art.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, implementations, and realizations, which can, of course, vary. It is also to be understood that the terminology used herein is for the purpose of describing particular embodiments only, and is not intended to be limiting.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or, "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed:

1. A method for improving signal quality in a receiver, comprising:
   receiving a signal having a bandwidth containing at least a desired channel signal, at a desired channel frequency, using a local oscillator of the receiver;
   sampling the received signal using an analog-to-digital converter (ADC) in the receiver to provide a digitized output signal of the ADC;
   determining spectral characteristic data relating to the digitized output signal of the ADC;
   processing the spectral characteristic data to identify one or more blocking signals and corresponding blocking signal frequencies;
   determining one or more blocking spur signals, each having a blocking spur level and corresponding blocking spur frequency based on the one or more blocking signals and ADC characterization data;
   calculating a ratio of an estimated desired channel signal level to a total interfering blocking spur level, wherein the total interfering blocking spur level is the sum of each blocking spur level that falls into the desired channel;
   determining whether the ratio is below a first threshold; and
   adjusting the frequency of one or more oscillators in the receiver based on the ratio being below the first threshold.

2. The method of claim 1, wherein the spectral characteristic data is obtained by a fast Fourier transform (FFT) of the output signal of the ADC.

3. The method of claim 1, wherein the ADC characterization data is based on ADC spurious response to one or more input signals.

4. The method of claim 1 further comprising:
   determining a candidate frequency delta and corresponding potential desired channel signal frequency, one or more potential blocking spur frequencies, and one or more potential blocking spur signal levels based on the ADC characterization data;
   calculating a potential ratio of the desired channel signal level to a total of the potential interfering blocking spur levels wherein potential blocking spur frequencies fall within the desired channel;
   determining whether the potential ratio is above the first threshold; and
   accepting the candidate delta frequency if the potential ratio is above the first threshold.

5. The method of claim 4 further comprising determining a different candidate frequency delta if the potential ratio is not above the first threshold.

6. The method of claim 4, further comprising:
   determining whether the potential ratio is below a second threshold; and
   accepting the candidate delta frequency if the potential ratio is above the second threshold.

7. The method of claim 6, further comprising determining a different candidate frequency delta if the potential ratio is below the second threshold.

8. The method of claim 1 further comprising:
   determining whether the ratio is below a second threshold, and if so,
   adjusting the frequency of the one or more oscillators at a subsequent time.

9. The method of claim 1, wherein determining one or more blocking spur signal levels includes accessing a look-up table stored in a memory device, the look-up table having ADC characterization data for the one or more blocking spur signals.

10. The method of claim 1, further comprising identifying one or more interfering spur signals by determining whether any blocking spur frequencies are substantially similar to the desired channel frequency.

11. The method of claim 1, wherein adjusting the frequency of one or more oscillators is also based on a harmonic order of at least one of the one or more blocking spur signals.

12. An apparatus comprising:
    an intermediate frequency (IF) mixer connected to an IF oscillator generating an IF signal having a bandwidth containing a plurality of channels, including a desired channel signal at a desired channel frequency;
    an analog-to-digital converter (ADC) coupled to the IF-mixer wherein an input signal of the ADC is the IF signal and an output signal of the ADC is a sampled IF signal;
    a frequency analysis module, coupled to the ADC, configured to determine spectral characteristic data of the sampled IF signal;
    an interference assessment module configured to:
      process the spectral characteristic data to identify one or more blocking signals and their corresponding harmonic blocking signal frequencies;
      determine one or more harmonic blocking spur signals, each having a blocking spur level and corresponding blocking spur frequency based on the one or more harmonic blocking signals and ADC characterization data;
      calculate a ratio of a desired channel signal level to a total interfering spur level wherein each interfering spur signal has an interfering spur level and the total interfering spur level is the sum of each interfering spur level;
      determine whether the ratio is below a first threshold; and
      provide instructions to adjust the frequency of one or more oscillators based on the ratio being below the first threshold.

13. The method of claim 12, wherein calculating of the ratio is only performed if one or more blocking spur frequencies is similar to the desired channel frequency.

14. The apparatus of claim 12, wherein the interference assessment module further configured to:
    determine a candidate frequency delta and corresponding potential desired channel signal frequency, one or more potential blocking signals, one or more potential blocking spur signals based on the characterization data;
    identify one or more potential interfering spur signals and corresponding potential interfering spur frequency;
    calculate a potential ratio of the desired channel signal level to a total potential interfering spur level wherein each potential interfering spur signal has a potential interfering spur and the total potential interfering spur level is the sum of each potential interfering spur level;

determine whether the potential ratio is below a first threshold; and accept the candidate delta frequency if the potential ratio is above the first threshold.

15. The apparatus of claim 14, wherein the interference assessment module further is configured to determine a different candidate frequency delta if the potential ratio is below the first threshold.

16. The apparatus of claim 14, wherein the interference assessment module configured to:

determine whether the potential ratio is below the second threshold; and accept the candidate delta frequency if the potential ratio is above the second threshold.

17. The apparatus of claim 16, wherein the second processor further configured to determine a different candidate frequency delta if the potential ratio is below the second threshold.

18. The apparatus of claim 12, wherein the interference assessment module is further configured to:

determine whether the ratio is below a second threshold; and if so provide instructions to adjust the frequency of the one or more oscillators at a subsequent time.

19. The apparatus of claim 12, wherein the interference assessment module identifies one or more interfering spur signals by determining whether any blocking spur frequencies are substantially similar to the desired channel frequency.

20. The apparatus of claim 12, wherein the interference assessment module is further configured to provide instructions to adjust the frequency of the one or more oscillators based on harmonic order of each of the one or more interfering spur signals.

* * * * *